US012755996B2

(12) United States Patent
Lee et al.

(10) Patent No.: US 12,755,996 B2
(45) Date of Patent: Oct. 6, 2026

(54) MEMBRANE-ELECTRODE ASSEMBLY CAPABLE OF SATISFYING BOTH OF TWO REQUIREMENTS OF EXCELLENT PERFORMANCE AND HIGH DURABILITY, AND FUEL CELL INCLUDING SAME

(71) Applicant: KOLON INDUSTRIES, INC., Seoul (KR)

(72) Inventors: Ju Sung Lee, Seoul (KR); Nak Won Kong, Seoul (KR); Jung Ho Kim, Seoul (KR); Jun Young Kim, Seoul (KR); Kyoung Sik Nam, Seoul (KR); Chan Mi Park, Seoul (KR); Kah Young Song, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 862 days.

(21) Appl. No.: 17/772,122

(22) PCT Filed: Sep. 9, 2021

(86) PCT No.: PCT/KR2021/012263
§ 371 (c)(1),
(2) Date: Apr. 26, 2022

(87) PCT Pub. No.: WO2022/080674
PCT Pub. Date: Apr. 21, 2022

(65) Prior Publication Data

US 2022/0407100 A1 Dec. 22, 2022

(30) Foreign Application Priority Data

Oct. 15, 2020 (KR) ........................ 10-2020-0133082

(51) Int. Cl.
*H01M 8/1004* (2016.01)
*H01M 4/86* (2006.01)
(Continued)

(52) U.S. Cl.
CPC ....... *H01M 8/1004* (2013.01); *H01M 4/8657* (2013.01); *H01M 4/8668* (2013.01);
(Continued)

(58) Field of Classification Search
CPC ............. H01M 8/1004; H01M 4/8657; H01M 4/8668; H01M 4/9016; H01M 4/9083;
(Continued)

(56) References Cited

U.S. PATENT DOCUMENTS

2008/0261103 A1* 10/2008 Ueda .................... H01M 8/1011
429/480
2017/0309924 A1 10/2017 Kundu
(Continued)

FOREIGN PATENT DOCUMENTS

CN 100472856 C 3/2009
CN 101689640 A 3/2010
(Continued)

OTHER PUBLICATIONS

Tanaka Hiroyuki, "JP2006339125A English Translation", Dec. 14, 2006.*

(Continued)

*Primary Examiner* — Matthew T Martin
*Assistant Examiner* — Alexandra J Simmons
(74) *Attorney, Agent, or Firm* — Harvest IP Law, LLP

(57) ABSTRACT

Disclosed are a membrane-electrode assembly capable of satisfying both of two requirements of excellent performance and high durability, and a fuel cell including same. The membrane-electrode assembly of the present invention comprises: a first electrode; a second electrode; and an electrolyte membrane between the first and second electrodes, wherein the first electrode includes a first segment
(Continued)

having a first durability and a second segment having a second durability that differs from the first durability.

11 Claims, 3 Drawing Sheets

(51) Int. Cl.

| | |
|---|---|
| ***H01M 4/90*** | (2006.01) |
| ***H01M 4/92*** | (2006.01) |
| ***H01M 8/0258*** | (2016.01) |
| ***H01M 8/0273*** | (2016.01) |
| ***H01M 8/10*** | (2016.01) |
| ***H01M 8/1018*** | (2016.01) |

(52) U.S. Cl.
CPC ....... *H01M 4/9016* (2013.01); *H01M 4/9083* (2013.01); *H01M 4/921* (2013.01); *H01M 4/926* (2013.01); *H01M 8/0258* (2013.01); *H01M 8/0273* (2013.01); *H01M 8/1018* (2013.01); *H01M 2004/8684* (2013.01); *H01M 2004/8689* (2013.01); *H01M 2008/1095* (2013.01)

(58) Field of Classification Search
CPC .... H01M 4/921; H01M 4/926; H01M 8/0258; H01M 8/0273; H01M 8/1018; H01M 2004/8684; H01M 2004/8689; H01M 2008/1095
See application file for complete search history.

(56) References Cited

U.S. PATENT DOCUMENTS

2018/0337409 A1* 11/2018 Yun ..................... H01M 4/8668
2023/0223565 A1* 7/2023 Imanaka et al. ...... H01M 8/248 429/456

FOREIGN PATENT DOCUMENTS

| | | | | | |
|---|---|---|---|---|---|
| CN | 107004862 | A | | 8/2017 | |
| CN | 107180986 | A | | 9/2017 | |
| CN | 108140846 | A | | 6/2018 | |
| CN | 110088960 | A | | 8/2019 | |
| JP | H06342665 | A | | 12/1994 | |
| JP | 2005-078975 | A | | 3/2005 | |
| JP | 2005-149802 | A | | 6/2005 | |
| JP | 2005259650 | A | | 9/2005 | |
| JP | 2006-179463 | A | | 7/2006 | |
| JP | 2006339125 | A | * | 12/2006 | ............. Y02E 60/50 |
| JP | 2006344525 | A | | 12/2006 | |
| JP | 2007-026783 | A | | 2/2007 | |
| JP | 2007-080726 | A | | 3/2007 | |
| JP | 2 008034191 | A | * | 2/2008 | ............. Y02E 60/50 |
| JP | 2008041411 | A | * | 2/2008 | ............. Y02E 60/50 |
| JP | 2008059921 | A | | 3/2008 | |
| JP | 2009-009724 | A | | 1/2009 | |
| JP | 2015162309 | A | | 9/2015 | |
| JP | 2018-097948 | A | | 6/2018 | |
| KR | 20080069248 | A | | 7/2008 | |
| KR | 20140012049 | A | | 1/2014 | |
| KR | 20140049970 | A | | 4/2014 | |
| KR | 20170105761 | A | | 9/2017 | |
| KR | 20210086509 | A | | 7/2021 | |
| TW | 202002374 | A | | 1/2020 | |

OTHER PUBLICATIONS

Kato Mitsuaki, "JP2008034191A English Translation", Feb. 14, 2008.*
Horibe Tetsushi, "JP2008041411A English Translation", Feb. 21, 2008.*
The office action dated Sep. 5, 2024 related to the corresponding Japanese divisional Patent application (Application. No. 2023-147227).
The office action dated Sep. 5, 2024 related to the corresponding Japanese divisional Patent application (Application. No. 2023-147573).
The office action dated Oct. 26, 2023 related to the corresponding Korean Patent application.
The office action dated Oct. 21, 2023 related to the corresponding Chinese Patent application.
The office action dated Jun. 9, 2023 related to the corresponding Japanese Patent application.
The search report dated Jul. 9, 2025 related to the corresponding European Patent application.

* cited by examiner (a)

(b)

( a )

( b )

MEMBRANE-ELECTRODE ASSEMBLY CAPABLE OF SATISFYING BOTH OF TWO REQUIREMENTS OF EXCELLENT PERFORMANCE AND HIGH DURABILITY, AND FUEL CELL INCLUDING SAME

CROSS REFERENCE TO RELATED APPLICATIONS

This application is a National Stage of International Application No. PCT/KR2021/012263 filed Sep. 9, 2021, claiming priority based on Korean Patent Application No. 10-2020-0133082 filed Oct. 15, 2020, the disclosures of which are incorporated herein by reference in their entireties.

TECHNICAL FIELD

The present disclosure relates to a membrane-electrode assembly and a fuel cell including the same, and more particularly to a membrane-electrode assembly capable of satisfying both requirements for excellent performance and high durability, and a fuel cell including the same.

BACKGROUND ART

A polymer electrolyte membrane fuel cell (PEMFC), which generates electricity using a stacked structure of unit cells, each including a membrane-electrode assembly (MEA) and a separator (also referred to as a "bipolar plate"), is drawing attention as a next-generation energy source capable of replacing fossil fuels due to the high energy efficiency and environmental friendliness thereof.

A membrane-electrode assembly generally includes an anode (also referred to as a "fuel electrode"), a cathode (also referred to as an "air electrode"), and a polymer electrolyte membrane interposed therebetween.

When fuel such as hydrogen gas is supplied to an anode, the hydrogen at the anode is oxidized to produce a proton ($H^+$) and an electron ($e^-$). The produced proton is transferred to the cathode through the polymer electrolyte membrane (PEM), whereas the produced electron is transferred to the cathode through an external circuit. Oxygen in the air supplied to the cathode is combined with the proton and electron and thus is reduced, thereby producing water.

In general, the performance and durability of a membrane-electrode assembly is closely related to the performance and durability of the electrode. However, a trade-off relationship between the performance and durability of the electrode such as the anode/cathode coerces either the performance or the durability of the electrode to be sacrificed. That is, oxidation/reduction catalysts having high catalytic activity tend to have unsatisfactory durability. On the other hand, oxidation/reduction catalysts having high durability tend to exhibit unsatisfactory performance.

As a result, those skilled in the field of fuel cells have conventionally considered the manufacture of a membrane-electrode assembly and/or fuel cell that satisfies requirements for both excellent performance and high durability impossible.

DISCLOSURE

Technical Problem

Therefore, the present disclosure relates to a membrane-electrode assembly capable of preventing the problems caused by limitations and disadvantages of the related art as described above, and a fuel cell including the same.

An aspect of the present disclosure is to provide a membrane-electrode assembly capable of satisfying both requirements for excellent performance and high durability.

Another aspect of the present disclosure is to provide a fuel cell capable of satisfying both requirements for excellent performance and high durability.

In addition to the aspects of the present disclosure described above, other features and advantages of the present disclosure will be described in the following detailed description, as will be clearly understood by those skilled in the art to which the present disclosure pertains.

Technical Solution

In accordance with the present disclosure, the above and other objects can be accomplished by the provision of a membrane-electrode assembly including a first electrode, a second electrode, and an electrolyte membrane disposed between the first and second electrodes, wherein the first electrode includes a first segment having a first durability and a second segment having a second durability different from the first durability.

The first segment may include a first catalyst, the second segment may include a second catalyst, and the first and second catalysts may be different from each other in terms of durability.

The first catalyst may include a first support and first metal particles dispersed on the first support, the second catalyst may include a second support and second metal particles dispersed on the second support, and the first and second supports may be different from each other.

The first durability may be higher than the second durability, the first support may be a crystalline carbon-based support or a conductive inorganic oxide support, and the second support may be a non-crystalline carbon-based support.

The first support may include graphitized carbon black, carbon nanotube, carbon nanofiber, $SnO_2$, $TiO_2$, or a mixture of two or more thereof, and the second support may include non-graphitic carbon black.

The first and second segments may be arranged side by side in a direction parallel to a surface of the electrolyte membrane.

The first durability may be higher than the second durability, and the first segment may occupy 50% or less of a total active area of the first electrode.

The first durability may be higher than the second durability, the first catalyst may include a first support and first metal particles dispersed on the first support, the second catalyst may include a second support and second metal particles dispersed on the second support, and a weight per unit area of the first metal particles in the first segment may be greater than a weight per unit area of the second metal particles in the second segment.

The first durability may be higher than the second durability, the first segment may further include a first ionomer, the second segment may further include a second ionomer, and a length of a side chain of the first ionomer may be shorter than a length of a side chain of the second ionomer.

The first durability may be higher than the second durability, the first catalyst may include a first support and first metal particles dispersed on the first support, the second catalyst may include a second support and second metal particles dispersed on the second support, and a loading rate of the first metal particles on the first support may be lower than a loading rate of the second metal particles on the second support.

The first durability may be higher than the second durability, the first segment may have a double-layer structure of first and second sub-layers sequentially formed over the electrolyte membrane, the second segment may have a single-layer structure, one of the first and second sub-layers may include a first catalyst, and each of the other of the first and second sub-layers and the second segment may include a second catalyst different from the first catalyst.

The first catalyst may include a first support and first metal particles dispersed on the first support, the second catalyst may include a second support and second metal particles dispersed on the second support, the first support may be a crystalline carbon-based support or a conductive inorganic oxide support, and the second support may be a non-crystalline carbon-based support.

The first electrode may be an anode at which an oxidation reaction of hydrogen occurs, the second electrode may be a cathode at which a reduction reaction of oxygen occurs, the first catalyst may be an oxygen evolution reaction (OER) catalyst, and the second catalyst may be a hydrogen oxidation reaction (HOR) catalyst.

The first electrode may be an anode at which an oxidation reaction of hydrogen occurs, the first durability may be higher than the second durability, the first segment may include an OER catalyst and a first HOR catalyst, the second segment may include a second HOR catalyst, and the first and second HOR catalysts may be the same as or different from each other.

The first electrode may be a cathode at which a reduction reaction of oxygen occurs, the second electrode may be an anode at which an oxidation reaction of hydrogen occurs, the first durability may be higher than the second durability, and the first segment may have higher porosity than the second segment.

In accordance with another aspect of the present disclosure, there is provided a fuel cell including a first separator, a second separator, and the membrane-electrode assembly described above disposed between the first and second separators, wherein, the first electrode is disposed between the first separator and the electrolyte membrane, the first separator includes a first inlet configured to supply a first gas to the first electrode, a first outlet configured to discharge the first gas, and a first flow channel disposed between the first inlet and the first outlet, the first durability is higher than the second durability, and the first segment is a segment corresponding to the first inlet or the first outlet.

The electrolyte membrane may have an active area and a non-active area surrounding the active area, the first electrode may be disposed on a first surface of the active area, the second electrode may be disposed on a second surface of the active area, and the fuel cell may further include a first sub-gasket disposed on the first surface of the non-active area, the first sub-gasket surrounding the first electrode, a second sub-gasket disposed on the second surface of the non-active area, the second sub-gasket surrounding the second electrode, a first gas diffusion layer disposed between the first electrode and the first separator, and a second gas diffusion layer disposed between the second electrode and the second separator.

The fuel cell may further include a first gasket disposed between the first sub-gasket and the first separator, the first gasket surrounding the first gas diffusion layer, and a second gasket disposed between the second sub-gasket and the second separator, the second gasket surrounding the second gas diffusion layer.

The above general description of the present disclosure is provided only for illustration of the present disclosure, and does not limit the scope of the present disclosure.

Advantageous Effects

According to the present disclosure, a membrane-electrode assembly that simultaneously satisfies both requirements for excellent performance and high durability can be provided.

Accordingly, the fuel cell of the present disclosure including the membrane-electrode assembly exhibits excellent performance and a sufficiently long life span as well.

DESCRIPTION OF DRAWINGS

The accompanying drawings, which are provided for better understanding of the present disclosure and constitute a part of the present specification, are given to exemplify the embodiments of the present disclosure and, together with the following detailed description, explain the principles and features of the present disclosure, in which:

(a) and (b) of FIG. 1 are a plan view and a cross-sectional view, respectively, of a membrane-electrode assembly according to an embodiment of the present disclosure;

Figure 2:
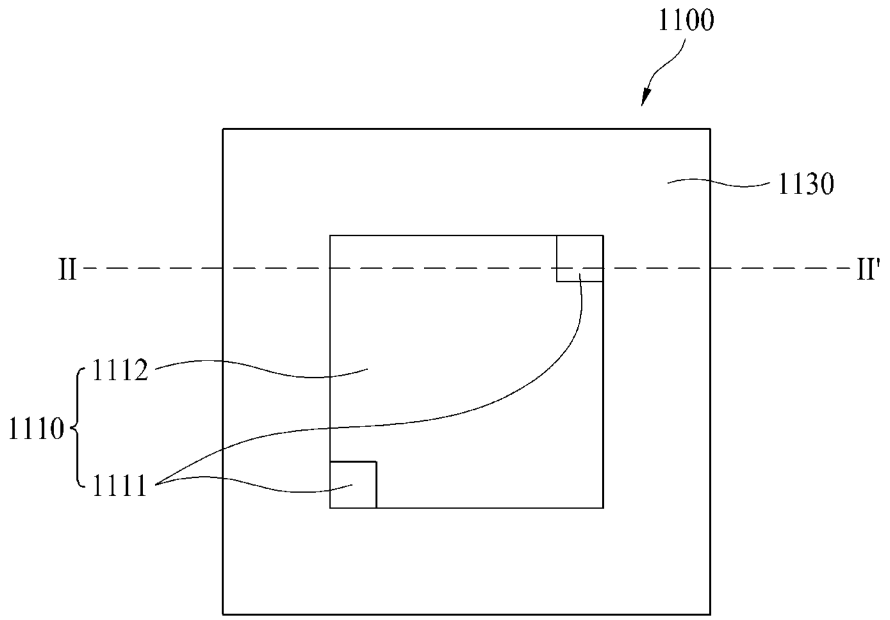
Figure 2:
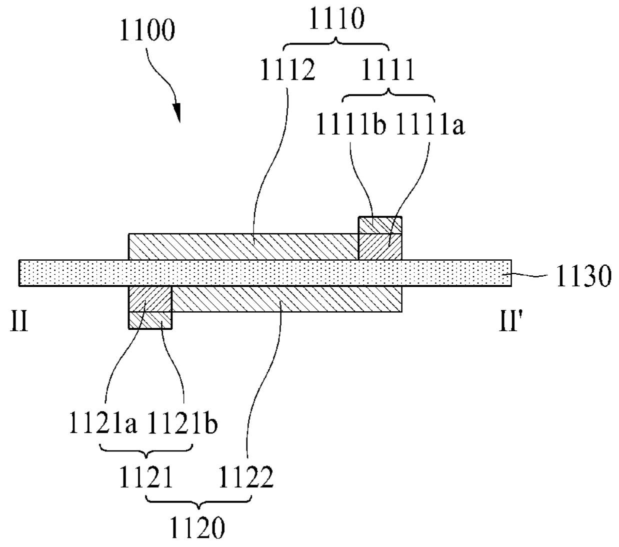
Figure 3:
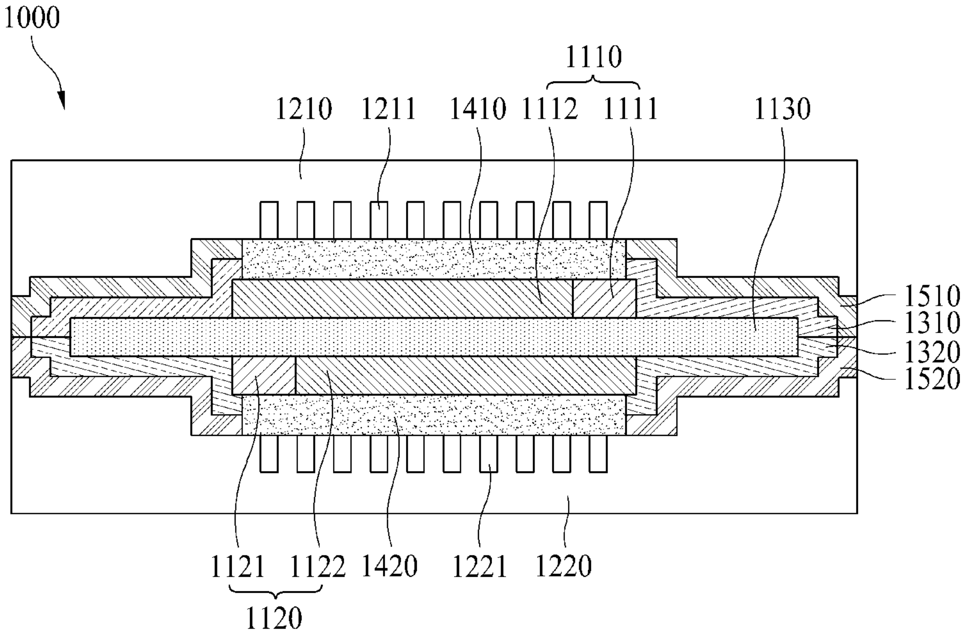
Figure 4:
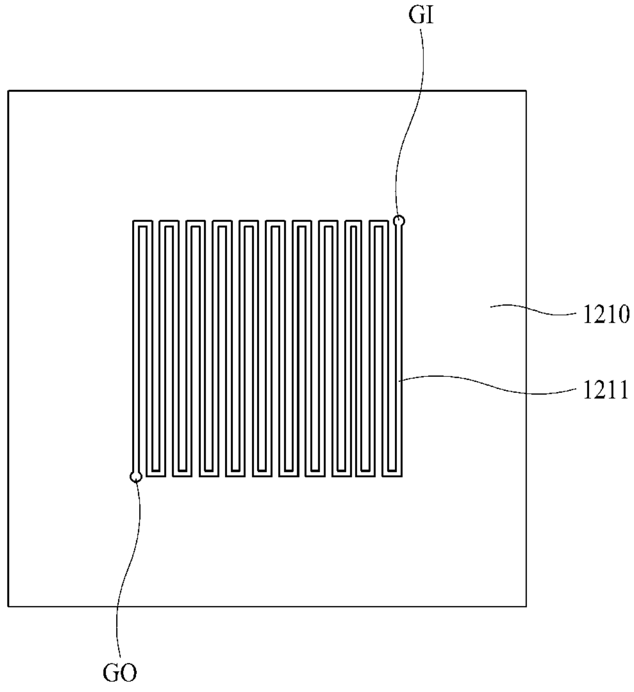

(a) and (b) of FIG. 2 are a plan view and a cross-sectional view, respectively, of a membrane-electrode assembly according to another embodiment of the present disclosure;

FIG. 3 is a cross-sectional view of a fuel cell according to an embodiment of the present disclosure; and FIG. 4 illustrates a flow channel of a separator according to an embodiment of the present disclosure.

MODE FOR INVENTION

Hereinafter, embodiments of the present disclosure will be described in detail with reference to the accompanying drawings. However, the following embodiments are illustratively provided merely for clear understanding of the present disclosure, and do not limit the scope of the present disclosure.

Figure 1:
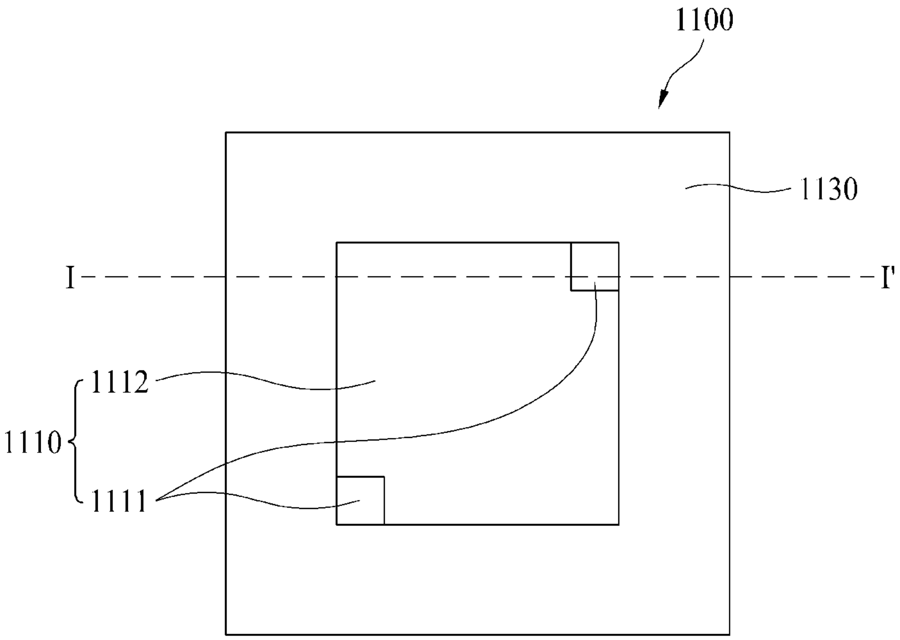
Figure 1:
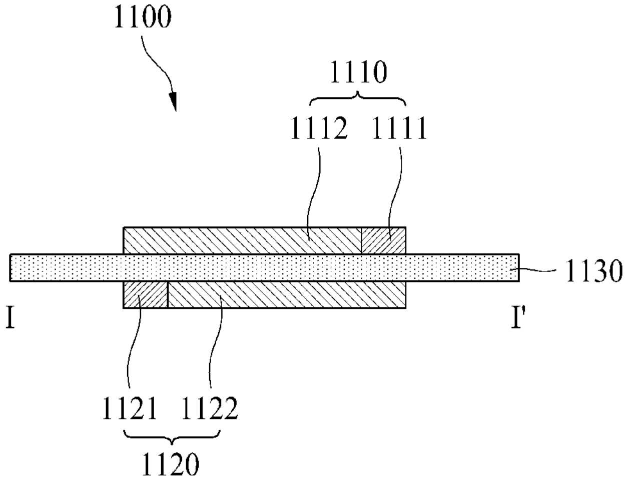

(a) and (b) of FIG. 1 are a plan view and a cross-sectional view, respectively, of a membrane-electrode assembly 1100 according to an embodiment of the present disclosure.

As shown in FIG. 1, the membrane-electrode assembly 1100 of the present disclosure includes a first electrode 1110, a second electrode 1120, and an electrolyte-membrane 1130 disposed between the first and second electrodes 1110 and 1120.

For example, the electrolyte membrane 1130 may be (i) a single membrane-type polymer electrolyte membrane formed of an ionomer, or (ii) a reinforced composite membrane-type polymer electrolyte membrane including a porous support impregnated with an ionomer.

In both types of electrolyte membranes 1130, the ionomer may be a fluorine-based ionomer or a hydrocarbon-based ionomer, and may include at least one ion-conducting group selected from the group consisting of a sulfonic group, a carboxyl group, a boronic group, a phosphoric group, an imide group, a sulfonimide group, a sulfonamide group, and a fluorosulfonic group.

For example, the ionomer may be a fluorine-based ionomer such as poly(perfluorosulfonic acid) or poly(perfluorocarboxylic acid).

Alternatively, the ionomer may be a hydrocarbon-based ionomer such as sulfonated polyimide (S-PI), sulfonated polyarylethersulfone (S-PAES), sulfonated polyetheretherketone (SPEEK), sulfonated polybenzimidazole (SPBI), sulfonated polysulfone (S-PSU), sulfonated polystyrene (S-PS), sulfonated polyphosphazene, sulfonated polyquinoxaline, sulfonated polyketone, sulfonated polyphenylene oxide, sulfonated polyether sulfone, sulfonated polyether ketone, sulfonated polyphenylene sulfone, sulfonated polyphenylene sulfide, sulfonated polyphenylene sulfide sulfone, sulfonated polyphenylene sulfide sulfone nitrile, sulfonated polyarylene ether, sulfonated polyarylene ether nitrile, sulfonated polyarylene ether ether nitrile, or sulfonated polyarylene ether sulfone ketone.

The porous support that can be used for the reinforced composite membrane-type polymer electrolyte membrane 1130 may be formed of polytetrafluoroethylene (PTFE) or a copolymer of tetrafluoroethylene and $CF_2{=}CFC_nF_{2n+1}$ (wherein n is an integer of 1 to 5) or $CF_2{=}CFO{-}(CF_2CF(CF_3)O)_mC_nF_{2n+1}$ (wherein m is an integer of 0 to 15 and n is an integer of 1 to 15). For example, an e-PTFE porous support in the form of an expanded film may be formed by extrusion-molding PTFE into a tape form in the presence of a lubricant, followed by expansion and thermal treatment. Additional expansion and thermal treatment may be further performed after the thermal treatment. By controlling the expansion and thermal treatment, various e-PTFE porous supports having microstructures can be obtained. For example, the e-PTFE porous support may have a microstructure in which nodes are connected to one another through fibrils or a microstructure consisting of only fibrils.

Alternatively, the porous support may be a nonwoven web. The nonwoven web may be formed with a support-forming liquid containing at least one hydrocarbon-based polymer selected from the group consisting of polyolefin (e.g., polyethylene, polypropylene, polybutylene, etc.), polyester (e.g. PET, PBT, etc.), polyamide (e.g., nylon-6, nylon-6,6, aramid, etc.), polyamic acid (supposed to be converted to polyimide through imidization after being molded into a web), polyurethane, polybutene, polylactic acid, polyvinyl alcohol, polyphenylene sulfide (PPS), polysulfone, fluid crystalline polymer, polyethylene-co-vinyl acetate, polyacrylonitrile, cyclic polyolefin, polyoxymethylene, and polyolefin-based thermoplastic elastomer.

The nonwoven web may be produced by any one method selected from the group consisting of wet-laying, electrospinning, carding, garneting, air-laying, melt blowing, spunbonding, and stitch bonding.

Each of the first and second electrodes 1110 and 1120 may be respectively formed on a first surface and a second surface opposite thereto of the first electrolyte membrane 1130 using an electrode slurry including a catalyst, an ionomer, and a dispersion medium, by means of a decal transfer method or a direct coating method.

As an effort to increase the active surface area of a catalyst, a catalyst in which metal particles are dispersed on a support having electrical conductivity is generally used.

The support may be (i) a carbon-based support, (ii) a conductive inorganic oxide support such as tin oxide, titania, zirconia, alumina, silica, and ceria, or (iii) a zeolite support.

The carbon-based support may be a crystalline carbon-based support or a non-crystalline carbon-based support.

Specifically, the carbon-based support may be graphitized or non-graphitic carbon black, activated carbon, stabilized carbon, carbon sphere, carbon fiber, carbon sheet, carbon ribbon, fullerene, carbon nanotube (CNT), carbon nanofiber, carbon nanowire, carbon nanoball, carbon nanohorn, carbon nanocage, carbon nanoring, carbon aerogel, graphene, ordered porous carbon, mesoporous carbon, nanoporous carbon, or a combination of two or more thereof.

In the present specification, the graphitized or non-graphitic carbon black encompasses all of graphitized or non-graphitic Ketjen black, graphitized or non-graphitic Denka black, graphitized or non-graphitic acetylene black, and so on.

Graphitized carbon black, carbon nanotube, carbon nanofiber, etc. may be classified as a crystalline carbon-based support, and non-graphitic carbon black may be classified as a non-crystalline carbon-based support.

The metal particles may be platinum (Pt) particles or platinum-based alloy particles. The platinum-based alloy may be Pt—Co, Pt—Cr, Pt—Fe, Pt—Mn, Pt—Mo, Pt—Ni, Pt—Pd, Pt—Ru, Pt—Sn, Pt—W, Pt—Au—Co, Pt—Au—Fe, Pt—Au—Ni, Pt—Co—Fe, Pt—Co—Ir, Pt—Co—Mn, Pt—Co—Ni, Pt—Co—P, Pt—Co—S, Pt—Cr—Ir, Pt—Fe—Ir, Pt—Fe—P, Pt—Fe—S, Pt—Ni—Ir, Pt—Ru—Ir, Pt—Ru—Mo, Pt—Ru—Ni, Pt—Ru—W, Pt—Ru—Ir—Ni, Pt—Ru—Rh—Ni, or Pt—Ru—Sn—W.

The ionomer dispersed in the dispersion medium together with the catalyst serves to transfer protons, and also functions as a binder for improving the adhesion strength between the first and second electrodes 1110 and 1120 and the electrolyte membrane 1130.

The aforementioned ionomers that may be used to form the electrolyte film 1130 may also be used to form the first and second electrodes 1110 and 1120. Although the ionomer of the electrolyte membrane 1130 and the ionomer of the first and second electrodes 1110 and 1120 are preferably the same type of ionomer, the present disclosure is not limited thereto and different types of ionomers may also be used for the manufacture of the electrolyte membrane 1130 and the first and second electrodes 1110 and 1120, respectively.

The dispersion medium of the electrode slurry may be ethanol, distilled water, isopropyl alcohol, normal propyl alcohol, butanol, or a mixture of two or more thereof, but is not limited thereto.

According to the present disclosure, as illustrated in FIG. 1, the first electrode 1110 includes a first segment 1111 having a first durability and a second segment 1112 having a second durability different from the first durability.

In general, deterioration of the first electrode 1110 due to long-time operation of the fuel cell does not occur over the entire area of the first electrode 1110, but rather occurs at a specific portion(s) (e.g., a portion corresponding to gas inlet/outlet, hereinafter, "deterioration-vulnerable portion"). Accordingly, by forming the first electrode 1110 in such a way that the deterioration-vulnerable portion (e.g., the first segment 1111) has higher durability than the remaining portion, the overall durability of the membrane-electrode assembly 1100 can be improved without sacrificing the performance of the remaining portion (e.g., the second the segment 1112).

The first and second segments 1111 and 1112 may be arranged side by side in a direction parallel to the surface of the electrolyte membrane 1130.

Similar to the first electrode 1110, the second electrode 1120 may also include segments 1121 and 1122 having different durability. For example, the second electrode 1120 may include a segment 1121 formed of the same material as the first segment 1111 of the first electrode 1110 and a segment 1122 formed of the same material as the second segment 1112 of the first electrode 1110.

According to an embodiment of the present disclosure, the first and second segments 1111 and 1112 of the first electrode 1110 may include different catalysts, thereby exhibiting different durability. That is, the first segment 1111 includes a first catalyst and the second segment 1112 includes a second catalyst, and the first and second catalysts may be different from each other in terms of durability.

Any one of the first and second catalysts (for example, the first catalyst) exhibits low performance but relatively high durability, and is used to form the deterioration-vulnerable portion [for example, the first segment 1111] of the first electrode 1110, whereas the other of the first and second catalysts (for example, the second catalyst) exhibits low durability but relatively high performance, and is used to form the remaining portion [for example, the second segment 1112] of the first electrode 1110.

As such, the formation of the deterioration-vulnerable portion and the remaining portion of the first electrode 1110 using different types of catalysts having different durability is much more advantageous in achieving the objects and effects of the present disclosure (i.e., in providing a membrane-electrode assembly that satisfies both requirements for excellent performance and high durability) than inducing a difference in durability between the deterioration-vulnerable portion and the remaining portion by means of other factors (e.g., difference in catalyst concentration/application amount/loading amount, difference in ionomer concentration, etc.).

As described above, as an effort to increase the active surface area of a catalyst, a catalyst in which metal particles are dispersed on a support having electrical conductivity is generally used. In other words, the first catalyst may include a first support and first metal particles dispersed on the first support, and the second catalyst may include a second support and second metal particles dispersed on the second support.

Accordingly, according to an embodiment of the present disclosure, in order for the first and second catalysts to have different durability, the first and second supports may be different from each other, and/or the first and second metal particles may be different from each other.

For example, a crystalline carbon-based support (e.g., graphitized carbon black, carbon nanotube, carbon nanofiber, etc.) or a conductive inorganic oxide support (e.g., a support containing $SnO_2$, $TiO_2$, or a mixture thereof) may be used as the first support, and a non-crystalline carbon-based support (e.g., non-graphitic carbon black, etc.) may be used as the second support, such that the first catalyst can exhibit better durability than the second catalyst and thus the first durability of the first segment 1111 can be higher than the second durability of the second segment 1112. In this case, the same type of metal particles may be used as the first and second metal particles, or the first metal particles may have higher durability than the second metal particles.

The first segment 1111 having a relatively high durability may be the deterioration-vulnerable portion of the first electrode 1110 (e.g., a portion corresponding to a gas inlet or a gas outlet of a separator described below), and may occupy 50% or less of the total active area of the first electrode 1110.

Furthermore, according to an embodiment of the present disclosure, the first and second catalysts are different from each other in terms of durability, and the weight per unit area of the first metal particles in the first segment 1111 may be different from the weight per unit area of the second metal particles in the second segment 1112, as well.

For example, the first catalyst may have superior durability than the second catalyst, and the weight per unit area of the first metal particles in the first segment 1111 may be greater than the weight per unit area of the second metal particles in the second segment 1112, so that the first durability of the first segment 1111 can be higher than the second durability of the second segment 1112. Here, the first and second metal particles may be the same as each other.

Alternatively, the first and second catalysts may be different from each other in terms of durability, and the first ionomer in the first segment 1111 and the second ionomer in the second segment 1112 may also be different from each other in terms of durability, as well. In general, the durability of an ionomer is closely related to the length of the side chain thereof. It has been found that the shorter the length of the side chain is, the lower the performance decrease rate in an accelerated lifetime test of a fuel cell is. That is, it can be said that as the length of the side chain of the ionomer decreases, durability increases. As such, according to this embodiment, the length of the side chain of the first ionomer may be different from the length of the side chain of the second ionomer.

For example, the first catalyst has better durability than the second catalyst and the length of the side chains of the first ionomer in the first segment is shorter than the length of the side chains of the second ionomer in the second segment, such that the first durability of the first segment 1111 can be higher than the second durability of the second segment 1112. In addition, optionally, the weight per unit area of the first metal particles in the first segment 1111 may be greater than the weight per unit area of the second metal particles in the second segment 1112.

Alternatively, the first and second catalysts may differ from each other in terms of durability, and the loading rate of the first metal particles on the first support may be different from the loading rate of the second metal particles on the second support, as well. Here, the first and second metal particles may be the same as each other.

In general, the higher the loading rate of the metal particles on the support is, the higher the risk of elution and/or agglomeration of the metal particles due to corrosion of the support is. Therefore, according to the alternative embodiment of the present disclosure, the first catalyst has superior durability compared to the second catalyst, and the loading rate of the first metal particles on the first support is lower than the loading rate of the second metal particles on the second support, such that the first durability of the first segment 1111 can be higher than the second durability of the second segment 1112. In addition, optionally, the weight per unit area of the first metal particles in the first segment 1111 may be greater than the weight per unit area of the second metal particles in the second segment 1112.

Alternatively, the first electrode 1110 may be an anode at which an oxidation reaction of hydrogen occurs, the first segment 1111 may include an oxygen evolution reaction (OER) catalyst (hereinafter, "OER catalyst") and a first hydrogen oxidation reaction (HOR) catalyst (hereinafter, "first HOR catalyst"), and the second segment 1112 may include a second hydrogen oxidation catalyst (hereinafter, referred to as "second HOR catalyst"), such that the first durability of the first segment 1111 can be higher than the second durability of the second segment 1112. The first and second HOR catalysts may be the same as or different from each other.

Each of the first and second HOR catalysts may include the aforementioned platinum (Pt) particle or platinum-based alloy particle (i.e., Pt—Co, Pt—Cr, Pt—Fe, Pt—Mn, Pt—Mo, Pt—Ni, Pt—Pd, Pt—Ru, Pt—Sn, Pt—W, Pt—Au—Co, Pt—Au—Fe, Pt—Au—Ni, Pt—Co—Fe, Pt—Co—Ir, Pt—Co—Mn, Pt—Co—Ni, Pt—Co—P, Pt—Co—S, Pt—Cr—Ir, Pt—Fe—Ir, Pt—Fe—P, Pt—Fe—S, Pt—Ni—Ir, Pt—

Ru—Ir, Pt—Ru—Mo, Pt—Ru—Ni, Pt—Ru—W, Pt—Ru—Ir—Ni, Pt—Ru—Rh—Ni, or Pt—Ru—Sn—W).

In general, reactions occurring at the anode to which hydrogen gas is supplied include (i) a hydrogen oxidation reaction performed by a HOR catalyst during the normal supply of hydrogen gas, and (ii) a carbon oxidation reaction that occurs upon a decrease or interruption of the supply of hydrogen gas due to fuel shortage, etc. The carbon oxidation reaction erodes the carbon-based support of the HOR catalyst, resulting in elution and/or agglomeration of the metal particles of the HOR catalyst. The OER catalyst is a catalyst that is capable of inhibiting the carbon oxidation reaction by inducing an oxygen evolution reaction, and includes a support and metal particles dispersed thereon. The support of the OER catalyst used herein may be the aforementioned carbon-based support, conductive inorganic oxide support, or zeolite support, and the metal particles of the OER catalyst may include $IrO_2$, $RuO_2$, $Ir_xSn_{1-x}O_2$ (x is a real number greater than 0 and less than 1), PtIr, IrRu, PtRuIr, or a mixture of two or more thereof.

(a) and (b) of FIG. 2 are, respectively, a plan view and a cross-sectional view of a membrane-electrode assembly 1100 according to another embodiment of the present disclosure.

As illustrated in FIG. 2, according to another embodiment of the present disclosure, the first segment 1111 has a double-layer structure of first and second sub-layers 1111*a* and 1111*b* sequentially formed on the electrolyte membrane 1130, and the second segment 1112 has a single-layer structure.

One of the first and second sub-layers 1111*a* and 1111*b* includes a first catalyst, and each of the other of the first and second sub-layers 1111*a* and 1111*b* and the second segment 1112 includes a second catalyst different from the first catalyst, whereby the first durability of the first segment 1111 may be higher than the second durability of the second segment 1112.

For example, as described above, a crystalline carbon-based support (e.g., graphitized carbon black, carbon nanotube, carbon nanofiber, etc.) or a conductive inorganic oxide support (e.g., a support containing $SnO_2$, $TiO_2$, or a mixture thereof) may be used as the first support of the first catalyst, and a non-crystalline carbon-based support (e.g., non-graphitic carbon black, etc.) may be used as the second support of the second catalyst, such that the first catalyst can exhibit better durability than the second catalyst. In this case, the same type of metal particles may be used as the first and second metal particles, or the first metal particles may have higher durability than the second metal particles.

Alternatively, when the first electrode 1110 is the anode at which the oxidation of hydrogen occurs and the second electrode 1120 is the cathode at which the reduction of oxygen occurs, the above-described OER catalyst may be used for the first catalyst and the above-described HOR catalyst may be used for the second catalyst, such that the first durability of the first segment 1111 can be higher than the second durability of the second segment 1112.

According to another embodiment of the present disclosure, the first electrode 1110 is the cathode at which a reduction reaction of oxygen occurs, the second electrode 1120 is the anode at which an oxidation reaction of hydrogen occurs, and the first segment 1111 has higher porosity than the second segment 1112, such that the water generated by the reduction reaction of oxygen can be more effectively discharged from the first segment 1111 than from the second segment 1112. Accordingly, the first segment 1111 from which water, which causes or accelerates electrode deterioration, can be better discharged has higher durability than the second segment 1112.

As described above, the second electrode 1120 also includes segments 1121 and 1122, each formed of the same material and structure as the above-described exemplary first and second segments 1111 and 1112 of the first electrode 1110. That is, the description of the first and second segments 1111 and 1112 of the first electrode 1110 may be equally applied to the segments 1121 and 1122 of the second electrode 1120.

Hereinafter, the fuel cell 1000 of the present disclosure will be described in detail with reference to FIGS. 3 and 4.

FIG. 3 is a cross-sectional view of a fuel cell 1000 according to an embodiment of the present disclosure, and FIG. 4 illustrates a flow channel 1211 of the first separator 1210 according to an embodiment of the present disclosure.

As illustrated in FIG. 3, the fuel cell 1000 of the present disclosure includes a first separator 1210, a second separator 1220, and the above-described membrane-electrode assembly 1100 between the first and second separators 1210 and 1220.

The first electrode 1110 of the membrane-electrode assembly 1100 is disposed between the first separator 1210 and the electrolyte membrane 1130. Similarly, the second electrode 1120 of the membrane-electrode assembly 1100 is disposed between the second separator 1220 and the electrolyte membrane 1130.

As illustrated in FIG. 4, the first separator 1210 includes a first inlet GI configured to supply a first gas to the first electrode 1110, a first outlet GO configured to discharge the first gas, and a first flow channel 1211 disposed between the first inlet GI and the first outlet GO.

According to the present disclosure, the first segment 1111 has higher durability than the second segment 1112 (i.e., the first durability is higher than the second durability), and the first segment 1111 is a segment corresponding to the first inlet GI and/or the first outlet GO.

Therefore, according to the present disclosure, by selectively forming the portion(s) corresponding to the first inlet GI and/or the first outlet GO of the first separator 1210 in the first electrode 1110, namely, deterioration-vulnerable portion(s), to have higher durability (i.e., by forming the first segment 1111 to have higher durability than the second segment 1112), a fuel cell 1000 that can satisfy both requirements of excellent performance and high durability can be provided.

In a similar way, the second separator 1220 also includes a second inlet (not shown) configured to supply a second gas to the second electrode 1120, a second outlet (not shown) configured to discharge the second gas, and a second flow channel 1221 disposed between the second inlet and the second outlet. In addition, the segment 1221 corresponding to the second inlet and/or the second outlet of the second separator 1220 in the second electrodes 1120 may be formed to have higher durability than the other segment 1222.

As illustrated in FIG. 3, the first and second electrodes 1110 and 1120 are arranged in such a way that the electrolyte membrane 1130 is disposed therebetween, and the electrolyte membrane 1130 includes an active area to transfer protons between the first and second electrodes 1110 and 1120 and a non-active area surrounding the active area. That is, the first electrode 1110 is disposed on the first surface of the active area of the electrolyte membrane 1130, and the second electrode 1120 is disposed on a second surface of the active area of the electrolyte membrane 1130.

As illustrated in FIG. 3, the fuel cell 1000 according to an embodiment of the present disclosure includes a first sub-gasket 1310 disposed on the first surface of the non-active area of the electrolyte membrane 1130 and a second sub-gasket 1320 disposed on the second surface of the non-active area of the electrolyte membrane 1130.

The first and second sub-gaskets 1310 and 1320 (*i*) prevent the edge of the electrolyte membrane 1130 from being damaged due to the repeated swelling and contraction thereof during the operation of the fuel cell 1000, (ii) solve the problem of difficulty in handling the membrane-electrode assembly 1100 due to the extremely small thickness of the electrolyte membrane 1130, and (iii) prevent the leakage of gas (i.e., hydrogen gas and/or air).

Each of the first and second sub-gaskets 1310 and 1320 has an electrode window to expose the first and second electrodes 1110 and 1120. That is, the first sub-gasket 1310 surrounds the first electrode 1110, and the second sub-gasket 1320 surrounds the second electrode 1120.

Each of the first and second sub-gaskets 1310 and 1320 may be formed by laminating, on the electrolyte membrane 1130, a film that has excellent heat resistance and chemical resistance within a temperature range from room temperature to 120° C., withstands a pressure of 100 torque or more, and has relatively low gas permeability. For example, each of the first and second sub-gaskets 1310 and 1320 may include a polyimide (PI)-based compound, a polyethylene (PE)-based compound, a polypropylene (PP)-based compound, a polyethylene terephthalate (PET)-based compound, a fluorinated ethylene propylene (FEP)-based compound, a polyethylene naphthalate (PEN)-based compound, or a mixture of two or more thereof.

A structure including the electrolyte membrane 1130, the first and second electrodes 1110 and 1120, and the first and second sub-gaskets 1310 and 1320 is also referred to as a “membrane-electrode assembly”, and in order to improve the productivity of such membrane-electrode assembly, a continuous roll-to-roll process may be adopted. For example, the continuous roll-to-roll process may include (i) continuously forming a plurality of first electrodes 110 and a plurality of second electrodes on the first and second surfaces of the electrolyte membrane 1130 provided in the form of a continuous film at a predetermined interval to obtain a catalyst-coated membrane (CCM), (ii) respectively laminating, on both surfaces of the CCM continuously provided, first and second sub-gasket films respectively having electrode windows arranged at a predetermined interval, and (iii) cutting the laminate thus obtained to form a plurality of individual membrane-electrode assemblies.

In addition, as illustrated in FIG. 3, the fuel cell 1000 according to an embodiment of the present disclosure may further include a first gas diffusion layer 1410 disposed between the first electrode 1110 and the first separator 1210 and a second gas diffusion layer 1420 disposed between the second electrode 1120 and the second separator 1220.

The main functions of the first and second gas diffusion layers 1410 and 1420 are (i) to provide gas diffusion channels from the flow channels 1211 and 1221 of the first and second separators 1210 and 1220 to the first and second electrodes 1110 and 1120 so as to enable gas (i.e., hydrogen gas and/or air) to be easily and uniformly supplied to the first and second electrodes 1110 and 1120, (ii) to allow water, which is a byproduct of the oxidation and reduction reaction, to be easily removed out of the first and second electrodes 1110 and 1120 so as to prevent flooding, (iii) to keep some water therein so as to prevent the water content of the electrolyte membrane 1130 from being rapidly reduced, and (iv) to impart sufficient mechanical strength to the membrane-electrode assembly 1100.

Each of the first and second gas diffusion layers 1410 and 1420 may include an electrically conductive porous member such as carbon paper, carbon cloth, carbon felt, metal paper, metal cloth, or metal felt.

Furthermore, as illustrated in FIG. 3, the fuel cell 1000 according to an embodiment of the present disclosure may further include a first gasket 1510 that is disposed between the first sub-gasket 1310 and the first separator 1210 and surrounds the first gas diffusion layer 1410, and a second gasket 1520 that is disposed between the second sub-gasket 1320 and the second separator 1220 and surrounds the second gas diffusion layer 1420.

The first and second gaskets 1510 and 1520 serve to prevent leakage of gas (i.e., hydrogen gas and/or air), and may be formed of a material such as, but not limited to, ethylene propylene diene monomer (EPDM), neoprene, urethane, acrylonitrile butadiene rubber (NBR), polytetrafluoroethylene (PTFE), and so on.

The invention claimed is:

1. A fuel cell comprising:

a first separator;

a second separator; and a membrane-electrode assembly disposed between the first and second separators, wherein the membrane-electrode assembly comprises:

an electrolyte membrane;

a first electrode disposed between the first separator and the electrolyte membrane; and a second electrode disposed between the second separator and the electrolyte membrane;

wherein the first electrode comprises first and second segments arranged side by side in a direction parallel to a surface of the electrolyte membrane, wherein the first segment comprises a first catalyst, wherein the second segment comprises a second catalyst different from the first catalyst, wherein the first electrode is a cathode at which a reduction reaction of oxygen occurs, wherein the second electrode is an anode at which an oxidation reaction of hydrogen occurs, wherein the first segment has higher porosity than the second segment such that water generated at the first electrode by the reduction reaction of oxygen is better discharged from the first segment than from the second segment, the first separator comprises a first inlet configured to supply a first gas to the first electrode, a first outlet configured to discharge the first gas, and a first flow channel disposed between the first inlet and the first outlet, and the first segment only includes both (i) a portion of the first electrode which corresponds to the first inlet of the first separator and (ii) a portion of the first electrode which corresponds to the first outlet of the first separator.

2. The fuel cell according to claim 1, wherein the first and second catalysts are different from each other in terms of durability.

3. The fuel cell according to claim 1, wherein the first catalyst comprises a first support and first metal particles dispersed on the first support, the second catalyst comprises a second support and second metal particles dispersed on the second support, and the first and second supports are different from each other.

4. The fuel cell according to claim 3, wherein the first support is a crystalline carbon-based support or a conductive inorganic oxide support, and the second support is a non-crystalline carbon-based support.

5. The fuel cell according to claim 4, wherein the first support comprises graphitized carbon black, carbon nanotube, carbon nanofiber, $SnO_2$, $TiO_2$, or a mixture of two or more thereof, and the second support comprises non-graphitic carbon black.

6. The fuel cell according to claim 1, wherein the first segment occupies 50% or less of a total active area of the first electrode.

7. The fuel cell according to claim 1, wherein the first catalyst comprises a first support and first metal particles dispersed on the first support, the second catalyst comprises a second support and second metal particles dispersed on the second support, and a weight per unit area of the first metal particles in the first segment is greater than a weight per unit area of the second metal particles in the second segment.

8. The fuel cell according to claim 1, wherein the first segment further comprises a first ionomer in addition to the first catalyst, the second segment further comprises a second ionomer in addition to the second catalyst, and a length of a side chain of the first ionomer is shorter than a length of a side chain of the second ionomer.

9. The fuel cell according to claim 1, wherein the first catalyst comprises a first support and first metal particles dispersed on the first support, the second catalyst comprises a second support and second metal particles dispersed on the second support, and a loading rate of the first metal particles on the first support is lower than a loading rate of the second metal particles on the second support.

10. The fuel cell according to claim 1, wherein the electrolyte membrane has an active area and a non-active area surrounding the active area, the first electrode is disposed on a first surface of the active area, the second electrode is disposed on a second surface of the active area, and the fuel cell further comprises:

a first sub-gasket disposed on the first surface of the non-active area, the first sub-gasket surrounding the first electrode;

a second sub-gasket disposed on the second surface of the non-active area, the second sub-gasket surrounding the second electrode;

a first gas diffusion layer disposed between the first electrode and the first separator; and a second gas diffusion layer disposed between the second electrode and the second separator.

11. The fuel cell according to claim 10, further comprising:

a first gasket disposed between the first sub-gasket and the first separator, the first gasket surrounding the first gas diffusion layer; and a second gasket disposed between the second sub-gasket and the second separator, the second gasket surrounding the second gas diffusion layer.

* * * * *